US012682405B2

(12) United States Patent (10) Patent No.: US 12,682,405 B2
Schäfer (45) Date of Patent: Jul. 14, 2026

(54) DEVICE FOR AGRICULTURAL MANAGEMENT

(71) Applicant: Bayer Aktiengesellschaft, Leverkusen (DE)

(72) Inventor: Dirk Schäfer, Kerpen (DE)

(73) Assignee: BAYER AKTIENGESELLSCHAFT (DE)

( * ) Notice: Subject to any disclaimer, the term of this patent is extended or adjusted under 35 U.S.C. 154(b) by 366 days.

(21) Appl. No.: 16/635,875

(22) PCT Filed: Jul. 26, 2018

(86) PCT No.: PCT/EP2018/070261
§ 371 (c)(1),
(2) Date: Jan. 31, 2020

(87) PCT Pub. No.: WO2019/025272
PCT Pub. Date: Feb. 7, 2019

(65) Prior Publication Data
US 2021/0241389 A1 Aug. 5, 2021

(30) Foreign Application Priority Data

| Aug. 2, 2017 | (EP) | ..................................... 17184422 |
| Aug. 2, 2017 | (EP) | ..................................... 17184423 |
| Aug. 2, 2017 | (EP) | ..................................... 17184426 |

(51) Int. Cl.
*A01G 7/00* (2006.01)
*A01B 69/00* (2006.01)
(Continued)

(52) U.S. Cl.
CPC .............. *G06Q 50/02* (2013.01); *A01B 69/00* (2013.01); *A01B 69/008* (2013.01); *A01B 79/00* (2013.01);
(Continued)

(58) Field of Classification Search
CPC ............. A01G 2/00; A01G 7/00; A01G 22/00
(Continued)

(56) References Cited

U.S. PATENT DOCUMENTS

| 6,044,324 A | * | 3/2000 | Boerhave | .................. E02D 1/00 |
| | | | | 702/5 |
| 6,820,009 B2 | * | 11/2004 | Sommer | ................ G06Q 10/08 |
| | | | | 702/2 |

(Continued)

FOREIGN PATENT DOCUMENTS

| CN | 101581713 A | 11/2009 |
| CN | 102957895 A | 3/2013 |

(Continued)

OTHER PUBLICATIONS

European Search Report dated Dec. 8, 2017 for European Application No. 17184426.9, filed Aug. 2, 2017, 7 pages.

(Continued)

*Primary Examiner* — David J Parsley
(74) *Attorney, Agent, or Firm* — MORRISON & FOERSTER LLP

(57) ABSTRACT

A device for agricultural management includes a processing unit to determine at least one geographical location of an agricultural land area, the determination comprising utilization of a GPS unit. Agricultural data is provided from an input unit to the processing unit. The processing unit determines agricultural management data, the determination comprising utilization of the at least one geographical location and the agricultural data. An output unit outputs agricultural management information to a user of the device on the basis of the agricultural management data.

10 Claims, 3 Drawing Sheets

(51) Int. Cl.

| | |
|---|---|
| *A01B 69/04* | (2006.01) |
| *A01B 79/00* | (2006.01) |
| *A01B 79/02* | (2006.01) |
| *A01C 1/00* | (2006.01) |
| *A01C 7/00* | (2006.01) |
| *A01C 21/00* | (2006.01) |
| *A01D 75/00* | (2006.01) |
| *A01G 22/00* | (2018.01) |
| *A01G 25/16* | (2006.01) |
| *A01M 7/00* | (2006.01) |
| *A01M 21/04* | (2006.01) |
| *G01S 19/13* | (2010.01) |
| *G01S 19/45* | (2010.01) |
| *G06Q 30/0201* | (2023.01) |
| *G06Q 50/02* | (2012.01) |
| *G06V 20/10* | (2022.01) |

(52) U.S. Cl.
CPC ............ *A01B 79/005* (2013.01); *A01B 79/02* (2013.01); *A01C 1/00* (2013.01); *A01C 7/00* (2013.01); *A01C 21/007* (2013.01); *A01D 75/00* (2013.01); *A01G 7/00* (2013.01); *A01G 22/00* (2018.02); *A01G 25/16* (2013.01); *A01M 7/0089* (2013.01); *A01M 21/043* (2013.01); *G01S 19/13* (2013.01); *G01S 19/45* (2013.01); *G06Q 30/0206* (2013.01); *G06V 20/188* (2022.01)

(58) Field of Classification Search
USPC ... 47/1.01 R, 1.43, 58.1 R, 58.1 SE, 58.1 FV
See application file for complete search history.

(56) References Cited

U.S. PATENT DOCUMENTS

| | | | | |
|---|---|---|---|---|
| 8,417,534 B2 * | 4/2013 | Belzer | ................... | G06Q 50/02 |
| | | | | 705/7.41 |
| 8,463,510 B2 * | 6/2013 | Knapp | ................. | A01D 41/127 |
| | | | | 701/50 |
| 9,024,972 B1 | 5/2015 | Bronder et al. | | |
| 10,241,209 B2 * | 3/2019 | Feldhaus | ................. | G01S 19/03 |
| 10,292,323 B2 * | 5/2019 | Missotten | ............ | A01D 41/127 |
| 10,664,702 B2 * | 5/2020 | Albrecht | ............. | G06V 20/188 |
| 2006/0142943 A1 | 6/2006 | Park | | |
| 2012/0176491 A1 | 7/2012 | Garin et al. | | |
| 2015/0094952 A1 | 4/2015 | Moeglein et al. | | |
| 2016/0035096 A1 | 2/2016 | Rudow et al. | | |
| 2016/0307373 A1 | 10/2016 | Dean et al. | | |

FOREIGN PATENT DOCUMENTS

| | | |
|---|---|---|
| JP | 2011198066 A | 10/2011 |
| JP | 2017072900 A | 4/2017 |
| WO | WO2011064445 A1 | 6/2011 |
| WO | 2012166202 A1 | 12/2012 |

OTHER PUBLICATIONS

International Search Report and Written Opinion dated Sep. 10, 2018 for International Application No. PCT/EP2018/070261, filed Jul. 26, 2018, 12 pages.

* cited by examiner

DEVICE FOR AGRICULTURAL MANAGEMENT

CROSS REFERENCE TO RELATED APPLICATIONS

This application is a national stage application under 35 U.S.C. § 371 of International Application No. PCT/EP2018/070261, filed internationally on Jul. 26, 2018, which claims priority benefit to European Application Nos. 17184426.9, filed Aug. 2, 2017, 17184423.6, filed Aug. 2, 2017 and 17184422.8 and filed Aug. 2, 2017.

FIELD OF THE INVENTION

The present invention relates to a device for agricultural management and a method for agricultural management, as well as to a computer program element and a computer readable medium.

BACKGROUND OF THE INVENTION

The general background of this invention is agricultural management. Increasingly sophisticated agricultural management systems are being provided to large scale agricultural enterprises, who operate sophisticated, sometimes automated, machinery within an integrated agricultural management system. However, a significant proportion of the food the world requires is produced by smallholders, who may have only one very small field, or a number of small fields, and who operate no, or little, mechanized machinery and for whom such sophisticated agricultural management systems are not appropriate.

SUMMARY OF THE INVENTION

It would be advantageous to provide agricultural management tools to aid such smallholders. It should be noted that the following described aspects and examples of the invention apply also for the device for agricultural management, the method for agricultural management, and for the computer program element and the computer readable medium.

According to some embodiments, there is provided a device for agricultural management, comprising:

an input unit;
a processing unit;
a GPS unit; and
an output unit.

The input unit is configured to provide the processing unit with agricultural data. The processing unit is configured to determine at least one geographical location of an agricultural land area. The determination comprises utilization of the GPS unit. The processing unit is configured also to determine agricultural management data, and the determination comprises utilization of the at least one geographical location and the agricultural data. The output unit is configured to output agricultural management information to a user of the device on the basis of the agricultural management data.

In this way, a farmer who may not necessarily know exactly where his farm or a field in that farm is located, is able to be provided with agricultural advice that is tailored to his location. In other words, a device such as a smartphone can use its GPS unit to determine a location of the smartphone. From that location, agricultural advice and/or information can be provided to the farmer via the screen of the smartphone.

In some embodiments, determination of the at least one geographical location of the agricultural land area comprises at least one movement of the GPS unit. In this manner, a farmer can move a device in order to determine the location of his field.

In some embodiments, the at least one movement comprises the device being moved around at least one boundary of the agricultural land area. In other words, the farmer can delineate a field through positioning the device at a boundary of the field. In some embodiments, the at least one movement comprises the device being moved around all of the boundaries of the agricultural land area. In this manner, a farmer can walk or otherwise move around the border of his field. Therefore, not only can agricultural advice/information be provided to the farmer that accounts for his location the advice/information can account for the size of the field.

In some embodiments, the device comprises a camera. The camera is configured to acquire at least one image of at least one part of the agricultural land area, The determination of the at least one geographical location of the agricultural land area can then comprise utilization of the at least one image.

Thus acquired imagery can be used to augment GPS provided data. In this way, the geographical location can be better determined through for example processing of landmarks in the imagery. In some embodiments, the at least one image comprises at least one image of at least boundary of the agricultural land area.

In other words, imagery of a boundary can be used to better locate a field, including determining its boundaries. This can involve utilization of satellite imagery. In some embodiments, the at least one image comprises images of all of the boundaries of the agricultural land area.

In other words, a farmer can walk or otherwise move around the borders of his field, and image processing can augment the GPS data to better determine not only the location of the field but its boundary. Thus, the spatial size of imagery can be used to determine the size of features at the field boundary from which the extent of the boundary can be determined. In some embodiments, the device has an inertial sensor configured to measure movement, and this information is used with the imagery to determine the outer boundary of the field and augment the GPS data to determine that boundary.

Utilization of imagery to augment GPS derived data can be especially important for very small fields that may only be 10 m wide or 20 m wide, and where absolute GPS errors could lead to significant errors in the determined field boundary.

In some embodiments, the device comprises a transmitter. The processing unit is configured to utilize the transmitter to transmit information comprising the at least one geographical location of the agricultural land area. The device also comprises a receiver. The agricultural data can then comprise specific agricultural data relating to the agricultural land area that has been received by the receiver.

In this manner, the geographical information, such as the absolute location of the field and its boundary can be sent to a remote server for example. Then specific agricultural advice can be sent to the farmer for that location. In some embodiments, the transmitted information comprises information input by the user. In other words the specific agricultural advice provided to the user, for that geographical location that can include the exact boundary of the field can take into account information such as the crop being grown by the user, when it was sown, the agricultural treatments such as herbicides and insecticides used by the farmer, how and when, when the field was watered, information on pests and diseases can also be acquired by the farmer that could be in written or image form and all or some of this information transmitted in order that the farmer receives bespoke agricultural advice that relates to what he or she is doing.

In some embodiments, the agricultural data comprises information input by the user.

According to some embodiments, there is provided a method for agricultural management, comprising:

a) determining by a processing unit of a device at least one geographical location of an agricultural land area, the determination comprising utilisation of a GPS unit of the device;

c) providing agricultural data from an input unit of the device to the processing unit;

d) determining by the processing unit agricultural management data, the determination comprising utilisation of the at least one geographical location and the agricultural data; and e) outputting by an output unit of the device agricultural management information to a user of the device on the basis of the agricultural management data.

In some embodiments, step a) comprises moving the GPS unit.

In some embodiments, the device comprises a transmitter and a receiver and wherein the method comprises step b) utilizing the processing unit to transmit via the transmitter information comprising the at least one geographical location of the agricultural land area, and wherein in step c) the agricultural data provided to the processing unit comprises specific agricultural data relating to the agricultural land area that has been received by the receiver.

According to some embodiments, there is provided a computer program element for controlling an apparatus according to the apparatus of the first aspect, which when executed by a processor is configured to carry out the method of the second aspect.

According to some embodiments, there is provided a computer readable medium having stored the program element. Advantageously, the benefits provided by any of the above aspects equally apply to all of the other aspects and vice versa.

BRIEF DESCRIPTION OF THE DRAWINGS

Exemplary embodiments will be described in the following with reference to the following drawings.

DETAILED DESCRIPTION OF EMBODIMENTS

Figure 1:
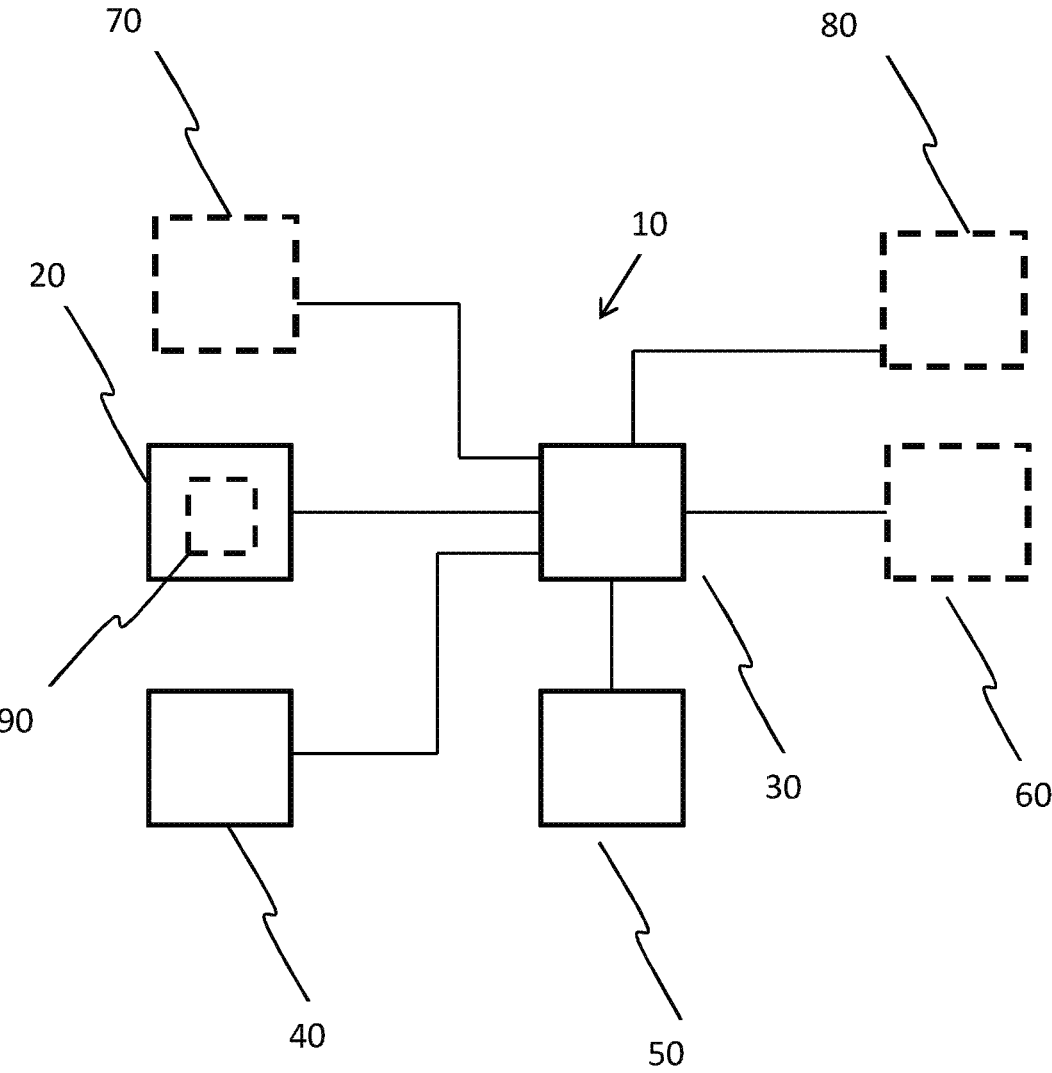
FIG. 1 shows a schematic set up of an example of a device for agricultural management.

FIG. 1 shows an example of a device 10 for agricultural management. The device 10 comprises an input unit 20, a processing unit 30, a GPS unit 40 and an output unit 50. The input unit 20 is configured to provide the processing unit 30 with agricultural data. The processing unit 30 is configured to determine at least one geographical location of an agricultural land area. The determination comprises utilization of the GPS unit 40. The processing unit 30 is configured also to determine agricultural management data. The determination of the agricultural management data comprises utilization of the at least one geographical location and the agricultural data. The output unit 50 is configured to output agricultural management information to a user of the device on the basis of the agricultural management data.

In some embodiments, the device is configured to receive satellite imagery of the landscape. In this way, a GPS determined location can also be correlated to satellite imagery in order to determine the extent and boundaries of the farmer's field from field boundaries observed in the satellite imagery. In some embodiments, the processing unit is configured to use imagery processing, such as edge detection filters to determine the field boundaries.

Advice to the farmer can relate to information such as, what crop to grow, how to grow a crop, what herbicide, insecticide or fertilizer to use, when and for what reason, whether there is no need to use a herbicide, insecticide or fertilizer and why they are not needed, when to water the crop, when to sow to the crop and when to harvest the drop. The information provided to the farmer can relate to what disease is affecting the crop, what pest is affecting the crop and how to remedy the situation through for example application of a herbicide or insecticide and when and how it should be applied. The information provided can relate to what price could be expected for a crop, where it could be sold in the local neighbourhood, and how the price for that crop is changing.

According to some embodiments, determination of the at least one geographical location of the agricultural land area comprises at least one movement of the GPS unit. According to some embodiments, the at least one movement comprises the device being moved around at least one boundary of the agricultural land area. According to some embodiments, the at least one movement comprises the device being moved around all of the boundaries of the agricultural land area.

According to some embodiments, the device comprises a camera 60. The camera 60 is configured to acquire at least one image of at least one part of the agricultural land area. Determination of the at least one geographical location of the agricultural land area in this example can then comprise utilization of the at least one image.

In some embodiments, the device is configured to receive satellite imagery of the landscape, and the processing unit is configured use the satellite imagery and the at least one image acquired by the camera of the device in determining the at least one geographical location. In other words, features that are in the acquired image can be compared and/or mapped onto satellite imagery in order to augment the GPS information to determine the at least one geographical location.

In this way, a GPS determined location can also be correlated to satellite imagery in order to determine the extent and boundaries of the farmer's field from field boundaries observed in the satellite imagery. In some embodiments, the processing unit is configured to use imagery processing, such as edge detection filters to determine the field boundaries. In some embodiments, from a general GPS determined location satellite imagery can be interrogated to provide the farmer with a number of bounded fields, any one or more of could be their field or fields. These for example could be colour coded. These images of fields are then presented to the farmer, for example on the screen of a smart phone. The farmer, looking at these fields located as they are within satellite imagery, will immediately, from geographical contextual information, such as his field has a big tree in the corner or is next to a stream or is next to the triangular field, for example, be able to indicate which of these fields is his field. This can be done by touching the screen at the position of his or her field. The potential fields can be presented in different colours to the farmer, making it easier to see the different fields in terms of structure and in the context of the surrounding geographical information.

According to some embodiments, the at least one image comprises at least one image of at least boundary of the agricultural land area. According to some embodiments, the at least one image comprises images of all of the boundaries of the agricultural land area. According to some embodiments, the device comprises a transmitter 70. The processing unit is configured then to utilize the transmitter to transmit information comprising the at least one geographical location of the agricultural land area. The device in these examples also comprises a receiver 80. The agricultural data that is provided to the processing unit then comprises specific agricultural data relating to the agricultural land area that has been received by the receiver. According to some embodiments, the transmitted information comprises information input by the user. According to some embodiments, the agricultural data comprises information input by the user. In some embodiments, the at least one input unit comprises a user input interface 90.

Figure 2:
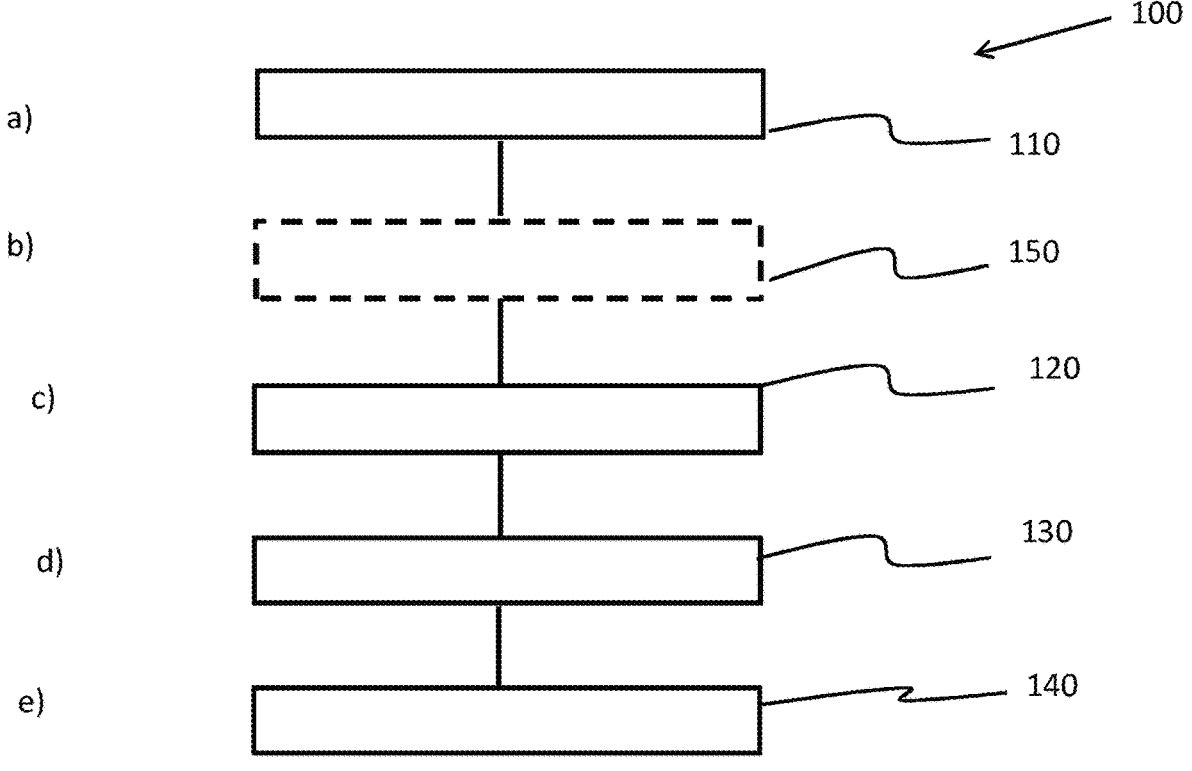
FIG. 2 shows a method for agricultural management according to some embodiments.

FIG. 2 shows a method 100 for agricultural management according to some embodiments. The method 100 comprises:

in a determining step 110, also referred to as step a), determining by a processing unit 30 of a device 10 at least one geographical location of an agricultural land area, the determination comprising utilisation of a GPS unit 40 of the device;

in a providing step 120, also referred to as step c), providing agricultural data from an input unit 20 of the device to the processing unit;

in a determining step 130, also referred to as step d), determining by the processing unit agricultural management data, the determination comprising utilisation of the at least one geographical location and the agricultural data; and in an outputting step 140, also referred to as step e), outputting by an output unit of the device agricultural management information to a user of the device on the basis of the agricultural management data.

According to some embodiments, step a) comprises moving the GPS unit. In some embodiments, moving the GPS unit comprises moving the device around at least one boundary of the agricultural land area. In some embodiments, moving the device comprises moving the device around all of the boundaries of the agricultural land area.

In some embodiments, the device comprises a camera, wherein the camera is configured to acquire at least one image of at least one part of the agricultural land area, and wherein determination of the at least one geographical location of the agricultural land area comprises utilization of the at least one image. In some embodiments, the at least one image comprises at least one image of at least boundary of the agricultural land area. In some embodiments, the at least one image comprises images of all of the boundaries of the agricultural land area.

According to some embodiments, the device comprises a transmitter and a receiver. The method can then comprise step b) utilizing 150 the processing unit to transmit via the transmitter information comprising the at least one geographical location of the agricultural land area. In this example, in step c) the agricultural data provided to the processing unit then comprises specific agricultural data relating to the agricultural land area that has been received by the receiver.

In some embodiments, the transmitted information comprises information input by the user. In some embodiments, the agricultural data comprises information input by the user. In some embodiments, the input unit comprises a user input interface.

In some embodiments, the output unit comprises a display configured to represent the agricultural management information.

Figure 3:
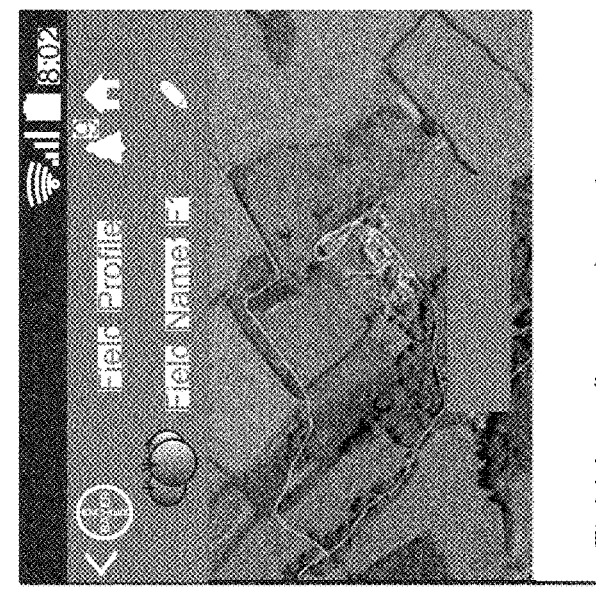
FIG. 3 shows a schematic set up of an example of the device for agricultural management being operated by a user.
Figure 3:
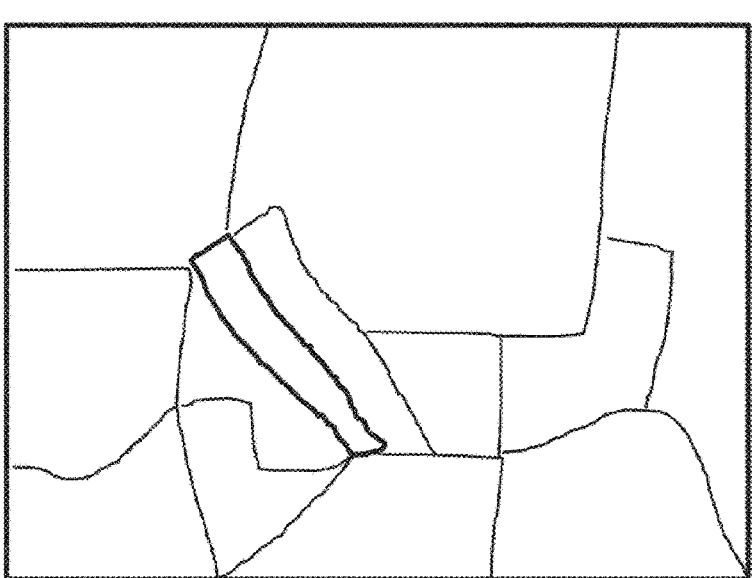
Figure 3:
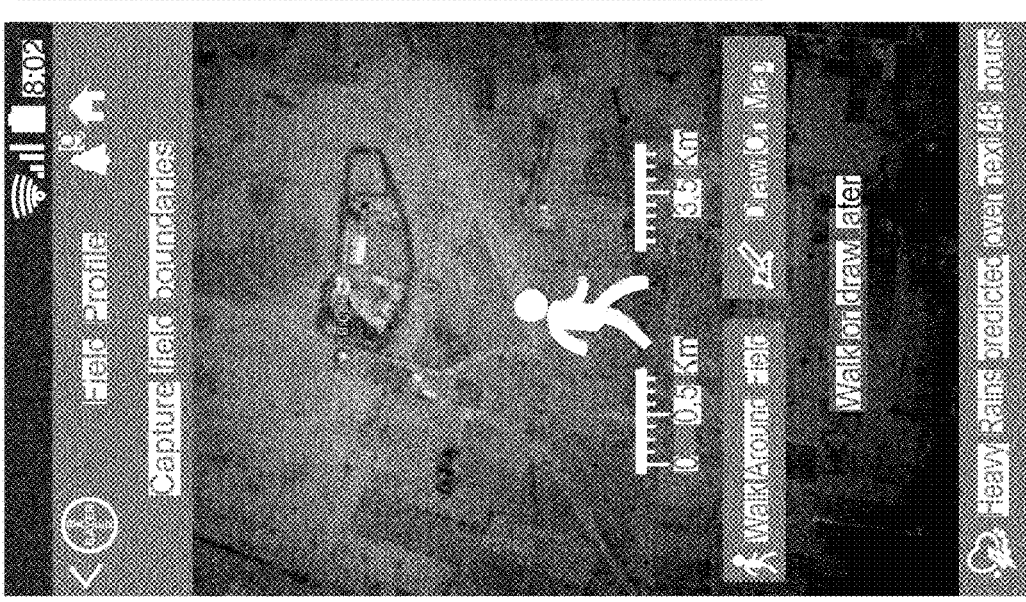

FIG. 3 shows an example of how a user uses the device. The user has an App on their smart phone. When asked to define where their field is to be found, the user is actually not sure. She lives in a rural community, has a very small field, and grows different seasonal crops that she sells at a local market. She grows her crops using the knowledge she has gained from successes and failures, and from knowledge gained from her neighbours. She however believes that she can do better, and is operating a device as described herein, that in this example is the smartphone operating an APP (application). Returning to her problem, as to where her field is to be located, the device requests that she walk around the boundary of her field. The device also asks that on her route around the field boundary she can take images of the boundary, but that this is not necessary. Having done this, she indicates that she has finished.

At this point, the mobile phone accesses a remote server via normal telecommunication transmissions, and information is downloaded to the smart phone. This information indicates what crops would be best to grow in that field. Knowing the size of the field, the farmer is provided with information regarding how much seed for example is required. Thus the remote server, from the general location of the user can provide information regarding the type of crop that could be grown and the seed sowing rate per unit area. A processor in the smartphone, from knowledge regarding the size of the field can then provide the farmer with information regarding the actual amount of seed required for her field. The farmer however can indicate the specific crop that she is growing, and can provide information via a keyboard and or take images regarding other information such as images of weeds, diseases and pests, and images of the crop itself. This information is again transmitted to the remote server, and the information provided back to the farmer indicates information such as what herbicides or pesticides/insecticides to use and how and when to use them as well as the quantities required. The information also specifies when to water the crop and when to harvest it.

Rather than use a remote server, if the smartphone has sufficient memory the database of information held on the remote server and the processing that is done to locate the field, and determine weeds/pests etc resides on the smartphone itself. In this case, information need not be sent to the remote server, but the farmer can be provided with the agricultural information even in remote locations with no telephonic coverage.

In some exemplary embodiments, a computer program or computer program element is provided that is characterized by being configured to execute the method steps of the method according to one of the preceding embodiments, on an appropriate system.

The computer program element might therefore be stored on a computer unit, which might also be part of an embodiment. This computing unit may be configured to perform or induce performing of the steps of the method described above. Moreover, it may be configured to operate the components of the above described apparatus and/or system. The computing unit can be configured to operate automatically and/or to execute the orders of a user. A computer program may be loaded into a working memory of a data processor. The data processor may thus be equipped to carry out the method according to one of the preceding embodiments.

These exemplary embodiments of the invention covers both, a computer program that right from the beginning uses the invention and computer program that by means of an update turns an existing program into a program that uses invention. Further on, the computer program element might be able to provide all necessary steps to fulfill the procedure of an exemplary embodiment of the method as described above.

According to some exemplary embodiments of the present invention, a computer readable medium, such as a CD-ROM, USB stick or the like, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to some exemplary embodiments of the present invention, a medium for making a computer program element available for downloading is provided, which computer program element is arranged to perform a method according to one of the previously described embodiments of the invention. It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A mobile device for agricultural management, comprising:
   a GPS unit; and
   a processor configured to:
     receive from an input agricultural data;
     receive at least one satellite image of an agricultural land area;
     receive at least one movement of the mobile device as a user carries the mobile device around an outer boundary of the agricultural land area;
     receive at least one user-acquired image of the outer boundary of the agricultural land area from a camera of the mobile device operated by the user, wherein the at least one user-acquired image of the agricultural land area is acquired as the user moves the mobile device around the agricultural land area;
   compare the at least one satellite image to the at least one user-acquired image;
   determine, using the GPS unit based on the at least one movement of the mobile device and the comparison between the at least one satellite image and the at least one user-acquired image, geographical information for the agricultural land area, wherein the geographical information indicates a geographical location of the outer boundary of the agricultural land area and an extent of the agricultural land area within the outer boundary;
   determine agricultural management data for the agricultural land area using the geographical information and the agricultural data; and
   output agricultural management information for the agricultural land area to a user of the device through a user interface, wherein the agricultural management information is based on the agricultural management data, and wherein the agricultural management information comprises a recommendation of one or more crops to farm in the agricultural land area, an amount of seed required for the determined extent of the agricultural land area within the outer boundary, and advice for acquiring, fertilizing, or treating the one or more crops indicated in the recommendation.

2. The mobile device of claim 1, wherein the at least one movement comprises the mobile device being moved around at least one outer boundary of the agricultural land area.

3. The mobile device of claim 2, wherein the at least one movement comprises the mobile device being moved around all outer boundaries of the agricultural land area.

4. The mobile device of claim 1, wherein the at least one user-acquired image comprises images of all outer boundaries of the agricultural land area.

5. The mobile device of claim 1, wherein the mobile device comprises a transmitter and wherein the processor is configured to utilize the transmitter to transmit information comprising the at least one geographical location of the agricultural land area, and wherein the mobile device comprises a receiver, and wherein the agricultural data comprises specific agricultural data relating to the agricultural land area that has been received by the receiver.

6. The mobile device of claim 5, wherein the transmitted information comprises information input by the user.

7. The mobile device of claim 1, wherein the agricultural data comprises information input by the user.

8. A method for agricultural management, comprising:

receiving by a processor at least one satellite image of an agricultural land area;

receiving by the processor at least one movement of a mobile device as a user carries the mobile device around an outer boundary of the agricultural land area;

receiving at least one user-acquired image of the agricultural land area from a camera of the mobile device operated by the user, wherein the at least one user-acquired image of the agricultural land area is acquired as the user moves the mobile device around the agricultural land area;

comparing the at least one satellite image to the at least one user-acquired image;

determining by the processor of the mobile device geographical information for the agricultural land area using a GPS unit of the mobile device based on the at least one movement of the mobile device and the comparison between the at least one satellite image and the at least one user-acquired image, wherein the geographical information indicates a geographical location of the outer boundary of the agricultural land area and an extent of the agricultural land area within the outer boundary;

receiving by the processor agricultural data from an input of the mobile device;

determining by the processor agricultural management data using the geographical and the agricultural data; and outputting by the processor to a user interface agricultural management information for the agricultural land area based on the agricultural management data, wherein the agricultural management information comprises a recommendation of one or more crops to farm in the agricultural land area, an amount of seed required for the determined extent of the agricultural land area within the outer boundary, and advice for acquiring, fertilizing, or treating the one or more crops indicated in the recommendation.

9. The method of claim 8, wherein the mobile device comprises a transmitter and a receiver and wherein the method comprises utilizing the processor to transmit via the transmitter information comprising the at least one geographical location of the agricultural land area, and wherein the agricultural data received by the processor comprises specific agricultural data relating to the agricultural land area that has been received by the receiver.

10. A non-transitory computer readable medium comprising instructions that, when executed by a processor, cause the processor to:

receive at least one satellite image of an agricultural land area;

receive at least one movement of a GPS unit as a user moves the GPS unit around an outer boundary of the agricultural land area;

receive at least one user-acquired image of the agricultural land area from a camera operated by the user, wherein the at least one user-acquired image of the agricultural land area is acquired as the user moves the camera around the agricultural land area;

compare the at least one satellite image to the at least one user-acquired image;

determine geographical information for the agricultural land area using the at least one movement of the GPS unit and the comparison between the at least one satellite image and the at least one user-acquired image, wherein the geographical information indicates a geographical location of the outer boundary of the agricultural land area that defines a location of the agricultural land area and an extent of the agricultural land area within the outer boundary;

receive agricultural data from an input;

determine agricultural management data using the geographical and the agricultural data; and output agricultural management information for the agricultural land area to a user interface based on the agricultural management data, wherein the agricultural management information comprises a recommendation of one or more crops to farm in the agricultural land area, an amount of seed required for the determined extent of the agricultural land area within the outer boundary, and advice for acquiring, fertilizing, or treating the one or more crops indicated in the recommendation.

* * * * *